United States Patent
Meeks (10) Patent No.: US 11,807,285 B2
(45) Date of Patent: Nov. 7, 2023

(54) PLYWOOD PANEL LIFT

(71) Applicants: Robert B. Jordan, IV, Mount Gilead, NC (US); Eddie Alexander Meeks, Greensboro, NC (US)

(72) Inventor: Eddie Alexander Meeks, Greensboro, NC (US)

(73) Assignees: Robert B. Jordan, IV, Mt. Gilead, NC (US); Eddie Alexander Meeks, Greensboro, NC (US)

( * ) Notice: Subject to any disclaimer, the term of this patent is extended or adjusted under 35 U.S.C. 154(b) by 0 days.

(21) Appl. No.: 17/545,081

(22) Filed: Dec. 8, 2021

(65) Prior Publication Data
US 2022/0194449 A1    Jun. 23, 2022

Related U.S. Application Data (60) Provisional application No. 63/127,243, filed on Dec. 18, 2020.

(51) Int. Cl.
*B62B 1/04* (2006.01)
*B62B 1/14* (2006.01)

(52) U.S. Cl.
CPC .............. *B62B 1/04* (2013.01); *B62B 1/147* (2013.01)

(58) Field of Classification Search
CPC .. B62B 1/04; B62B 1/147; B62B 1/14; B62B 1/125; B62B 1/128; B62B 2206/06
See application file for complete search history.

(56) References Cited

U.S. PATENT DOCUMENTS

| | | | |
|---|---|---|---|
| 4,278,244 A * | 7/1981 | Carter | B62B 1/268 D34/24 |
| 4,488,733 A | 12/1984 | Hellsten | |
| 4,630,838 A | 12/1986 | Stockton | |
| 4,943,073 A | 7/1990 | Wander | |
| 5,288,090 A * | 2/1994 | Brass | B62B 1/26 280/35 |
| 5,458,020 A * | 10/1995 | Wang | B62B 1/125 280/655 |
| 5,782,477 A * | 7/1998 | Covert | B62B 1/268 280/47.32 |

(Continued)

FOREIGN PATENT DOCUMENTS

| | | | | |
|---|---|---|---|---|
| FR | 2523943 A1 * | 9/1983 | | |
| FR | 2750942 A1 * | 1/1998 | ........... | B62B 5/0083 |

(Continued)

*Primary Examiner* — Steve Clemmons
(74) *Attorney, Agent, or Firm* — MacCord Mason PLLC (57) ABSTRACT

A frame has a wheel assembly that can move up or down. A linkage extends between a catch to the wheel assembly and a grip on the frame, so the wheel assembly can be released for vertical movement with respect to the channel. A tray affixed to the frame near the bottom of the channel can receive a panel when the wheel assembly is at an upper position. Then, the frame and panel can be briefly lifted off the ground. The linkage can be activated to release the catch so the wheel assembly drops and is secured by the catch in a lower position, resulting in the wheel's protrusion below the bottom of the frame. This causes the weight of the device and the panel to be borne on the wheel, so the panel can be wheeled around the jobsite by one person.

11 Claims, 7 Drawing Sheets

(56) References Cited

U.S. PATENT DOCUMENTS

| | | | | |
|---|---|---|---|---|
| 5,820,145 | A | * 10/1998 | Osowski | B62B 1/268 |
| | | | | 280/79.7 |
| 5,988,659 | A | 11/1999 | Young | |
| 6,213,672 | B1 | * 4/2001 | Varga | A47L 13/20 |
| | | | | 403/109.1 |
| 6,295,698 | B1 | * 10/2001 | Chang | A45C 13/262 |
| | | | | 280/655 |
| 6,868,583 | B2 | * 3/2005 | Kuo | F16B 7/105 |
| | | | | 16/113.1 |
| 7,101,136 | B1 | 9/2006 | Ray et al. | |
| 7,896,367 | B1 | 3/2011 | Suprono | |
| 8,002,291 | B1 | * 8/2011 | Sandoval | B62B 1/268 |
| | | | | 280/47.32 |
| 10,343,275 | B2 | 7/2019 | Bransford | |
| 2002/0159863 | A1 | 10/2002 | Ray | |
| 2006/0151967 | A1 | * 7/2006 | Conway | B62B 1/268 |
| | | | | 280/79.7 |
| 2018/0312183 | A1 | * 11/2018 | Sanford | B62B 3/009 |

FOREIGN PATENT DOCUMENTS

| | | | | | |
|---|---|---|---|---|---|
| GB | 989763 | A | * | 4/1965 | |
| GB | 1300339 | A | * | 12/1972 | |
| GB | 2485975 | A | * | 6/2012 | B62B 1/12 |
| JP | 05085363 | A | * | 4/1993 | |

* cited by examiner

PLYWOOD PANEL LIFT

BACKGROUND

A difficult task for a lone worker is to transport one or more sheets of plywood, drywall, oriented strand board, a pane of glass, or similar large, flat, heavy sheets. It would be helpful for such a worker to have a tool to ease that task. For simplicity hereinafter, the term "panel" will be used but that term should be construed to include plywood, drywall, or similar flat sheets that are large, heavy, and/or otherwise cumbersome.

SUMMARY

The present invention fulfills one or more of these needs in the art by providing a tool for moving panels that includes a frame having an upper end and a lower end, a tray mounted to the lower end of the frame, and a wheel assembly having a wheel. The wheel assembly is mounted to the frame for travel toward the upper end and toward the lower end with respect to the frame. A catch is included to bind the wheel assembly to the frame at an upper position and at a lower position on the frame. The lower position is located on the frame so that a bottom of the wheel extends below the tray, and the upper position is located so that the bottom of the wheel does not extend below the tray. An actuator for the catch enables a user to bind the wheel assembly to the frame at the upper and lower positions on the frame. A panel can be loaded to the tray, the wheel assembly can be bound to the frame at the lower position to enable movement of the panel to a destination by rolling the wheel on a horizontal surface, and the wheel assembly can be unbound from the frame to lower the panel for unloading from the tray at the destination.

The catch may be mounted on the frame and include a retractable pin which can extend into an upper hole in the wheel assembly at the lower position and into a lower hole in the wheel assembly at the upper position. The catch may include a spring to urge the retractable pin into the respective upper and lower holes. A linkage may be included to retract the pin from the respective upper and lower holes.

In some embodiments the frame includes a handle that has an operator control and the linkage connects the operator control to the catch. The operator control may be at the handle and may be connected to the catch by a mechanical linkage. In some embodiments the handle has operator controls at two opposing handle ends so an operator gripping the handle with either a left hand or a right hand can move the operator control with the thumb of the hand gripping the handle.

The frame may have a linkage fork pivotally mount on the frame above the tray and below the handle, a lower linkage rod from the linkage fork to the catch and first and second control rods from the linkage fork to the respective operator controls.

The frame may have an internal passageway and the wheel assembly may have a vertical stem disposed within the internal passage way with holes in the vertical stem to receive a pin from the catch to bind the wheel assembly to the frame at the upper position and at the lower position on the frame.

The invention can also be considered to be method of transporting a panel including loading a panel onto a tray of a frame at a loading location, lowering a wheel on the frame so that a bottom of the wheel extends below the tray and the frame, rolling the frame and panel from the loading location to an unloading location, raising the wheel on the frame so that a bottom of the wheel does not extend below the tray and the frame, and removing the panel from the tray and the frame.

BRIEF DESCRIPTION OF THE DRAWINGS

The invention will be better understood by a reading of the Detailed Description of Examples along with a review of the drawings, in which.

DETAILED DESCRIPTION OF EXAMPLES

In an example, a frame has a channel in it in which a wheel assembly can move up or down. A linkage extends between a catch to the wheel assembly and a grip on the frame, so the wheel assembly can be selectively bound and released for vertical movement with respect to the channel. A cross-wise tray is affixed to the frame at the bottom of the frame. A panel can be mounted on the tray when the wheel assembly is at an upper position. Then, the entire assembly can be briefly lifted off the ground, the linkage can be activated to release the catch so the wheel assembly can move down and be secured by the catch in a lower position, causing the wheel to protrude below the tray. This causes the weight of the device and the panel to be borne on the wheel, so the panel can be wheeled around the jobsite. At a destination, the assembly is lifted briefly and the linkage is activated to cause the catch to release the wheel assembly from its lower position, enabling the wheel assembly to move back up the channel and be bound by the catch. The panel can be lifted off the tray. The device allows an operation that normally would require two people to be done by one person.

Figure 1:
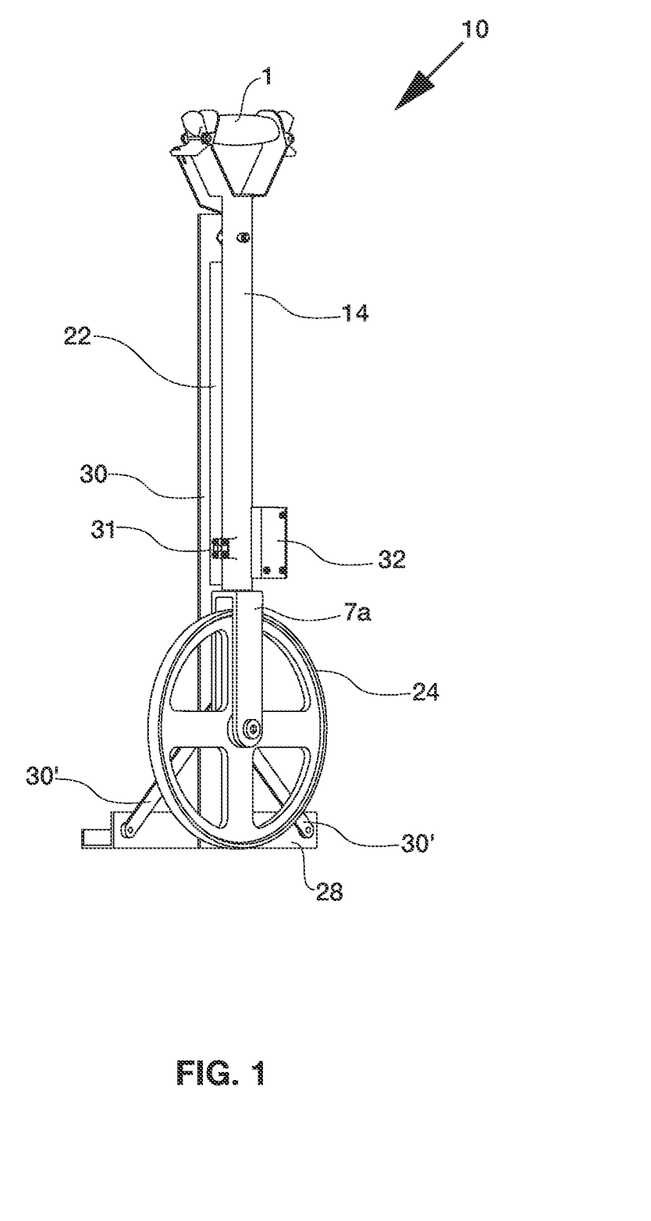
FIG. 1 is a perspective view of a panel lift tool.
Figure 7:
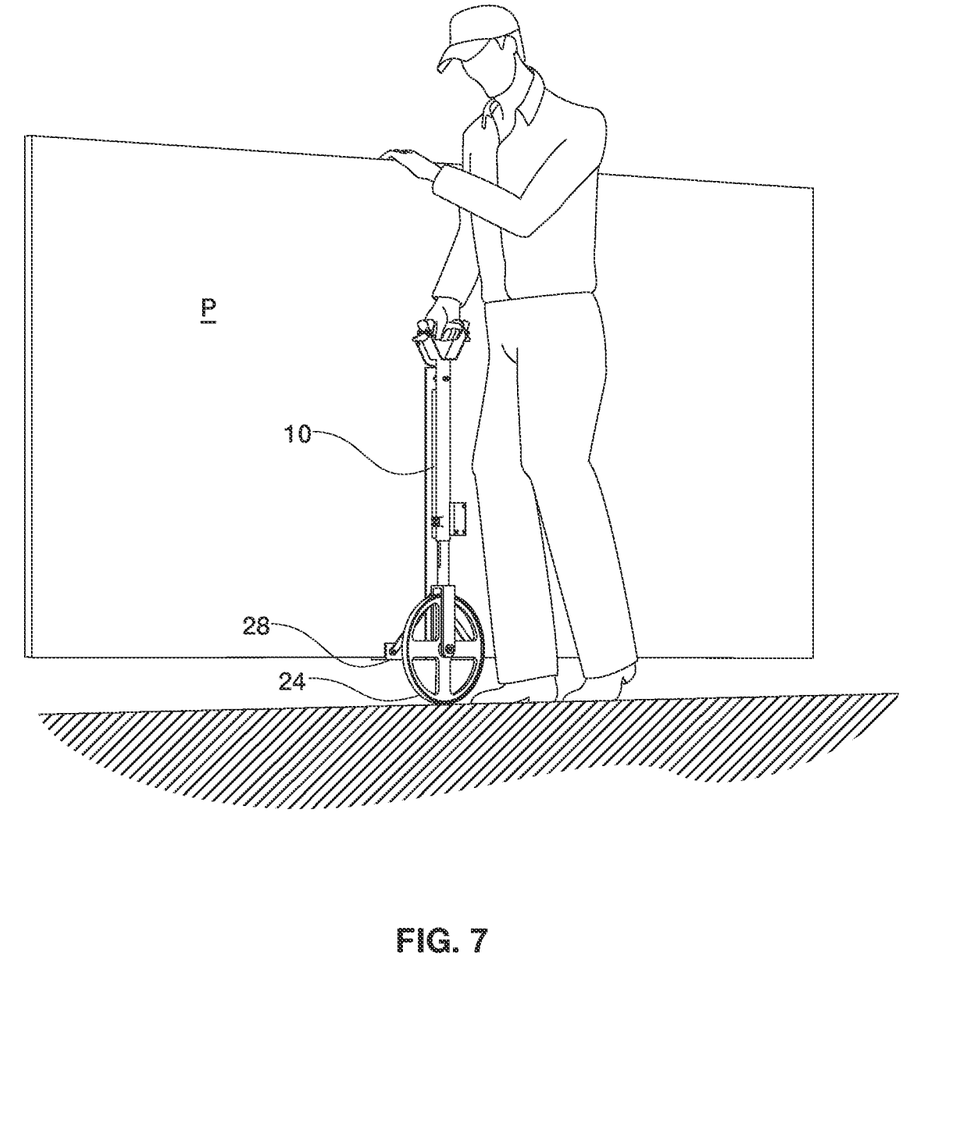
FIG. 7 is a perspective view of a panel lift tool with a panel being installed by a user.

As can be seen in FIG. 7 a panel P is shown placed on a panel lift tool 10. FIG. 1 shows the tool 10 with a handle 1, an upright 14, a standoff 22, and a panel cradle, which is made up of a plate 30 and a tray 28. Diagonal braces 30' brace the tray 28 to the plate 30. The standoff 22 separates the cradle from the upright 14. The upright 14 has an internal bore (not shown).

Figure 2:
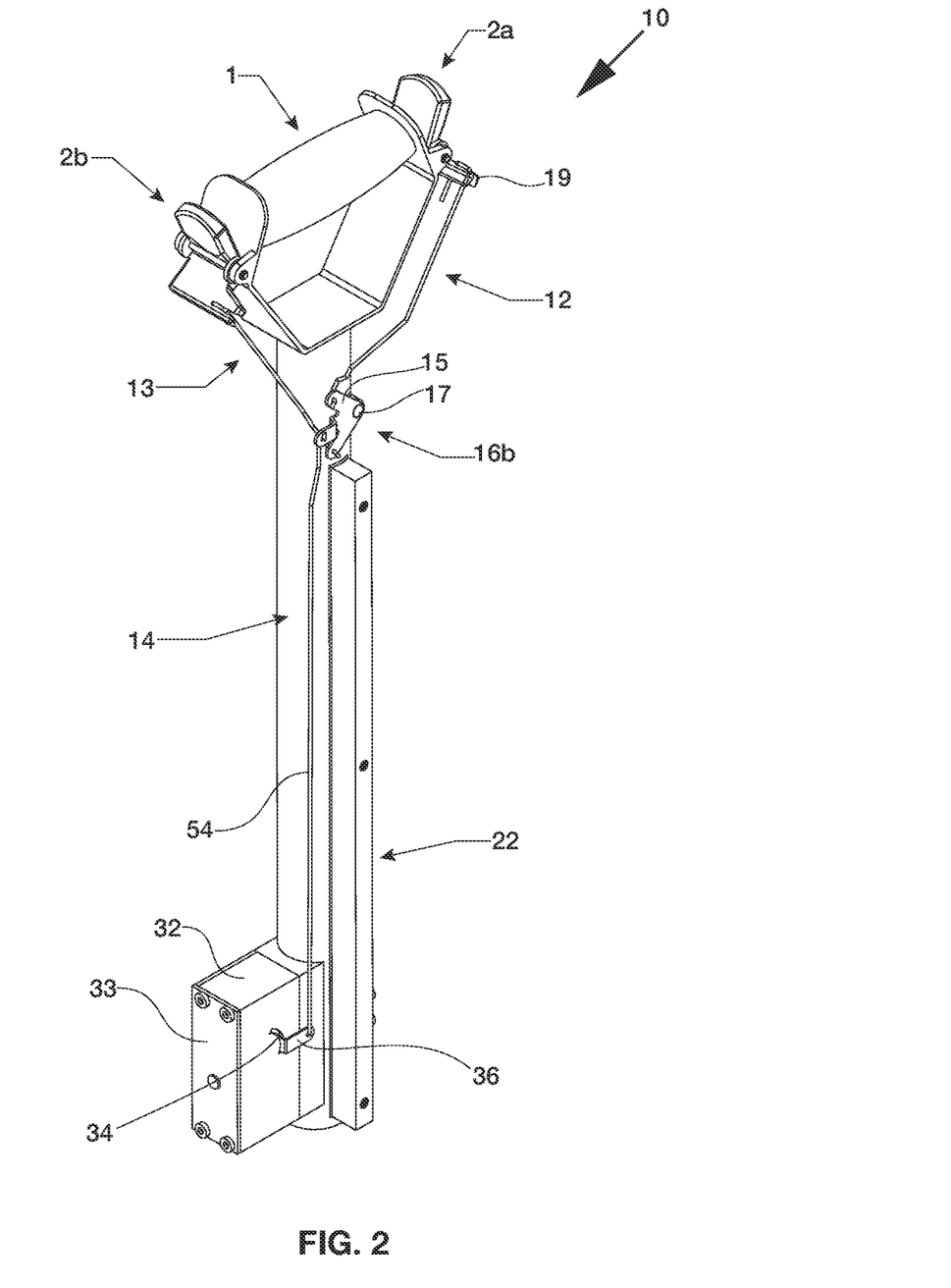
FIG. 2 is a perspective view of an upper frame subassembly of the panel lift tool.

As seen in FIG. 2 the frame upright 14 is topped with a handle 1 and has a side-mounted box 32. The box 32 is shown in more detail in connection with FIG. 6. The handle includes a hand grip with two opposed thumb-actuated levers 2a and 2b that are hinged to the handle 1 and have control rods 12 and 13. Each control rod is mounted in its respective thumb-actuated lever. The rods have a top end shaped as a U-shaped component that extends up through a tapered or conical (seen more clearly in FIG. 4) hole 19 in the thumb-actuated lever and down another tapered or conical hole, so the control rods 12 and 13 can rock back and forth within the conical holes as the levers 2a, 2b are depressed. Each of the control rods 12 and 13 is connected to a linkage 15 which is pivotally mounted at 17 to the upright 14. Extending below the linkage 15 is a lower connecting rod 54 that connects to a lower linkage 37 via an arm 36 that protrudes through a curved slot 34 from box 32. Opposite the box 32 a mounting 31 supports a pin (not shown) that extends within the bore of the upright 14.

As seen in FIG. 2 the two thumb-actuated levers or operators 2a and 2b are positioned on either side of the grip so that whether the grip is manipulated with the right hand or left hand, an operating lever is located so it can be depressed by the thumb of the user whose hand is on the grip. For example in the view of FIG. 2 a grip with a right hand allows the operating lever 2b to be depressed with the operator's right hand thumb. Gripping with the left hand would allow the operating lever 2a to be depressed with the thumb of the left hand.

Figure 3A:
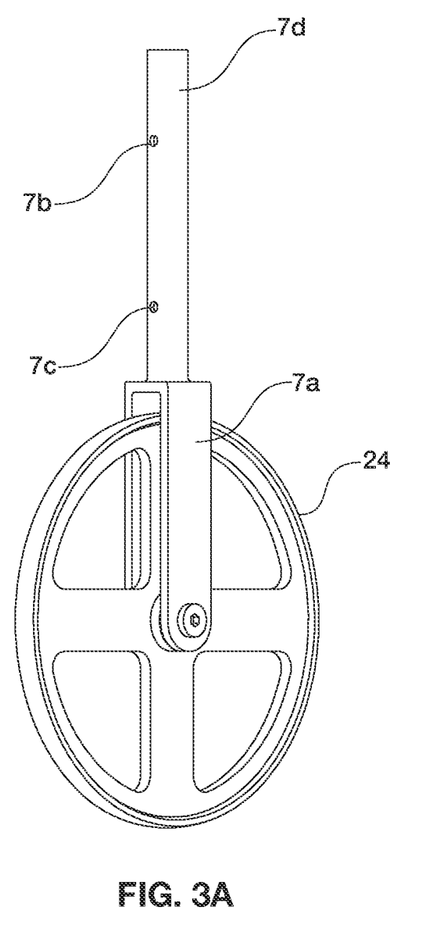
FIG. 3A is a perspective view of a lower wheel subassembly of the panel lift tool.
Figure 3B:
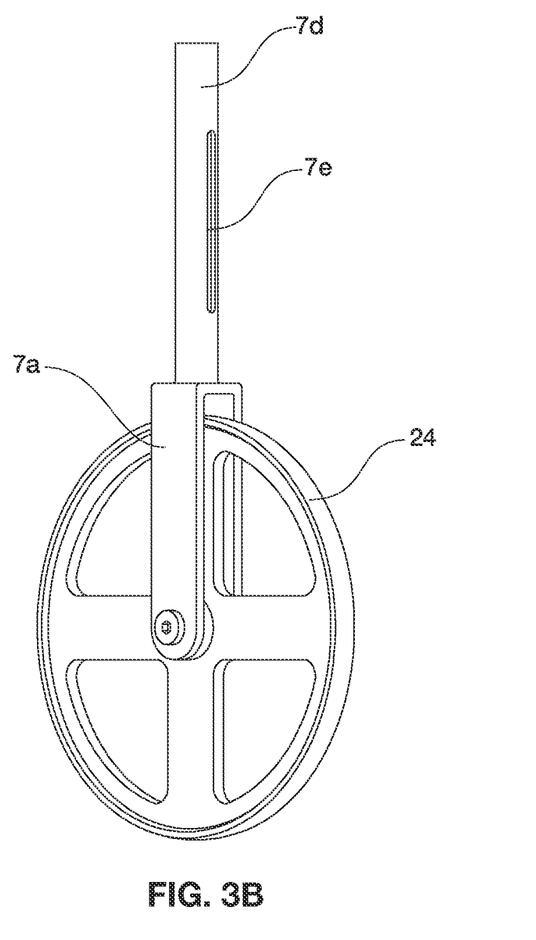
FIG. 3B is a different perspective view of a lower wheel subassembly of the panel lift tool.

FIG. 3A shows a lower wheel assembly 7 including a stem 7d that is disposed within the internal bore in the upright 14 (not shown in FIG. 3) so it can move up and down within the bore in the upright 14. The upper stem 7d has holes 7b and 7c that engage with the pin 40 (see FIG. 6) to hold the stem 7d in a selected vertical position. The assembly 7 has forks 7a and a wheel 24 that rotates within the forks 7a. FIG. 3B shows that the upper stem has a vertical slot 7e opposite the holes 7b and 7c. The positioning and length of the slot 7e permit the slot to receive the pin supported by the mounting 31 of the upright 14. The pin and slot 7e cooperate to prevent rotation of the upper stem 7d within the bore and to limit vertical movement of the upper stem within the bore. The upper limit aligns the hole 7b with the pin 40 that extends into the bore from the box 32, and the lower limit aligns the hole 7c with the pin 40.

Figure 4:
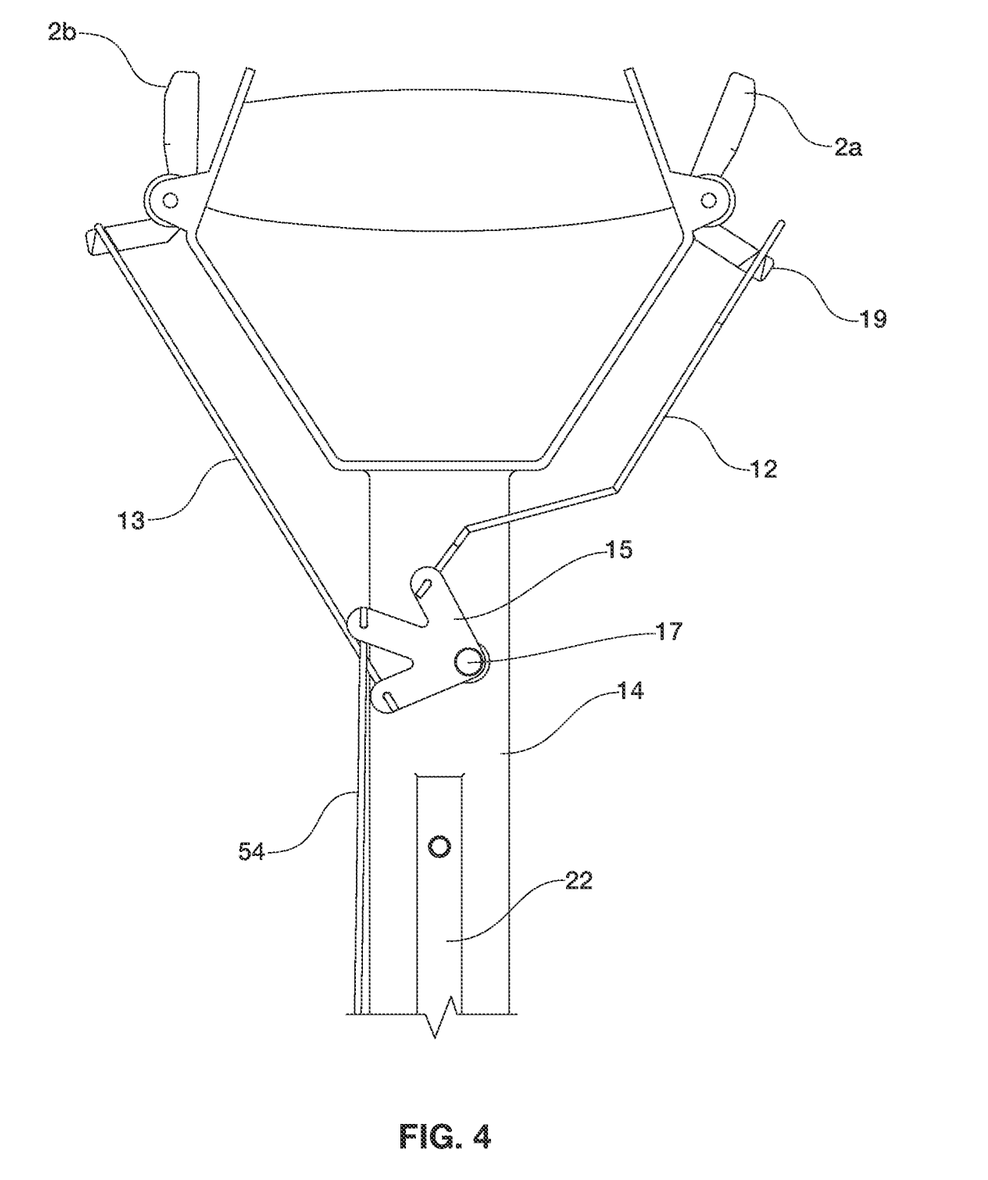
FIG. 4 is an enlarged, partial, front view of the upper frame subassembly.

FIG. 4 shows the conical or tapered holes 19 of the thumb-actuated levers 2a and 2b. FIG. 4 also shows how the standoff 22 provides a space between the upright 14 and the plate 30, allowing the connecting rod 54 to freely move up and down, as controlled by the linkage 15.

Figure 6:
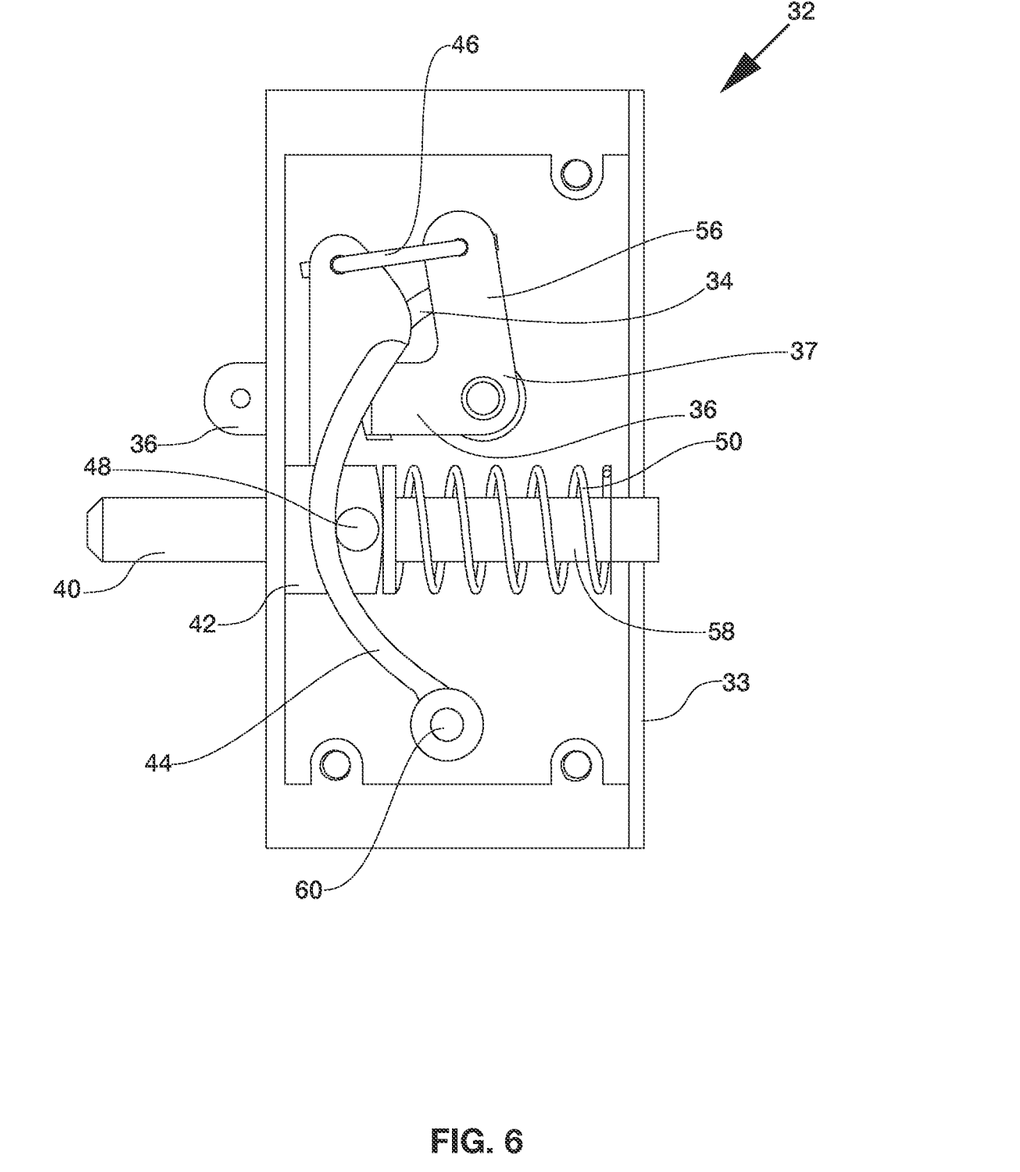
FIG. 6 is an enlarged view of operative elements of the catch of box 32.

FIG. 6 shows an embodiment of the catch. This figure shows the inside of the box 32 in more detail. The linkage 37 is shown pivoted inside the box 32 and having link arms 35 and 56. Link arm 56 is operatively joined by a connecting rod 46 to a flange on a curved plate 44. The bottom of the curved plate 44 is pivotally mounted within the box 32 at pivot point 60. The plate 44 has a hole (not shown) in it that pin 40 extends through. The pin 40 has a boss 42, and it has a cross-wise pin 48, which is shown in FIG. 6 as perpendicular to the page. A back end 58 of the pin 40 is encircled with a compression spring 50 that bears against the boss 42 and the wall 33 of the box, with the pin 40 extending through a hole in the wall 33.

When one of the thumb-actuated levers 2a or 2b is depressed to pull up on the connecting rod 54, link arm 36 and linkage 37 rotate counterclockwise from the position shown in FIG. 6. This causes link arm 56 and connecting rod 46 to rotate to the right, in turn causing the curved plate 44 to rotate around pivot point 60. The moving curved plate 44 presses against the cross-wise pin 48 so the pin 40 moves to the right in the view of FIG. 6, with the boss 42 compressing spring 50. The extent of travel of pin 40 is sufficient so that the pin 40 retracts from a respective hole 7b or 7c, allowing vertical movement of the stem 7d within the bore of the upright 14.

When a selected vertical position is achieved, the thumb-actuated operator 2a or 2b is released, which causes the assembly 7 to re-engage with the upright 14 because the force of the spring 50 restores the pin 40 to the position shown in FIG. 6 so it extends into a respective hole 7b or 7c.

Figure 5A:
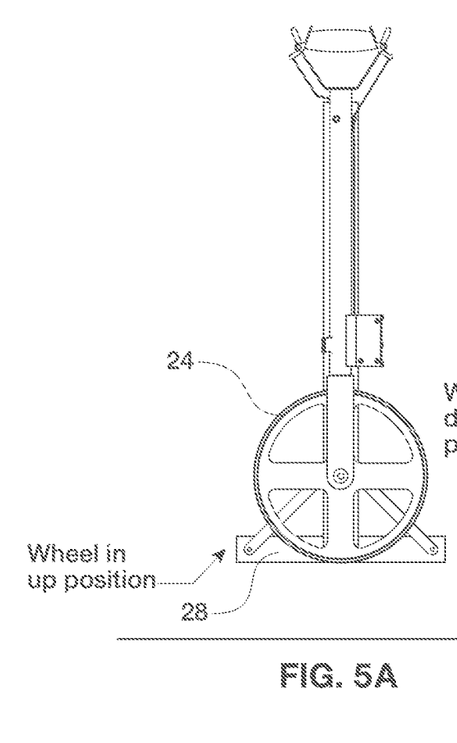
FIGS. 5A and 5B are each a front view of the panel lift tool, but in two different states.
Figure 5B:
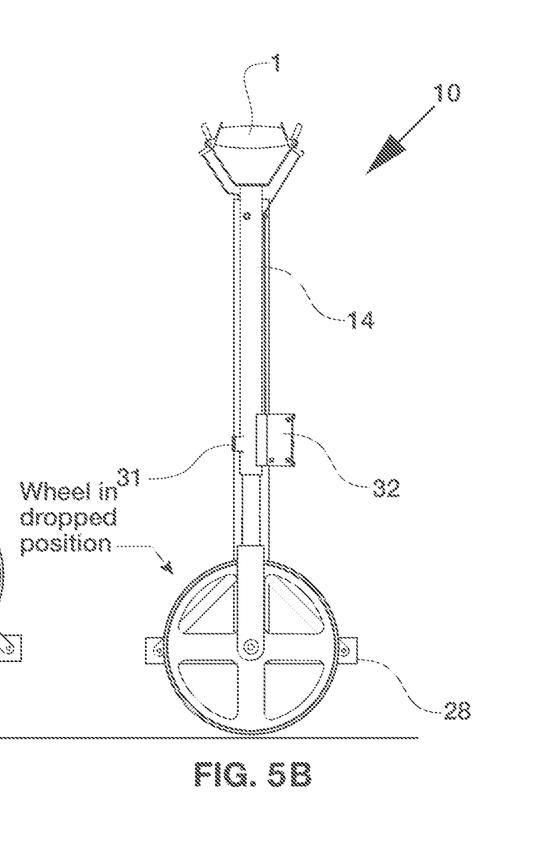

FIGS. 5A and 5B shows two operative positions for the tool 10. FIG. 5A shows the wheel 24 raised with respect to the tray 28 so the bottom of the wheel 24 does not extend below the tray 28. The wheel can be positioned thusly for loading or unloading of a panel from the tray.

FIG. 5B shows the wheel 24 lowered with respect to the tray 28 so the bottom of the wheel 24 is below the bottom of the tray and the rest of the tool. In this position, the tool with a panel P resting in the tray 28 can roll over a surface (such as a floor) controlled by a single operator holding the handle 1, perhaps with his or her other hand lapped over the top of the panel P. For many applications with standard sizes of plywood or drywall, the handle is about 30 inches above the tray 28 (as illustrated in FIG. 1), so that the user can use much of his or her body strength to lift the panel, for the lifting described herein. Other lengths can be used. A vertical extent of the panel can also lean against the plate 30 which stands off from the upright 14.

If the user is lowering the wheel 24 to the position shown in FIG. 5B, he or she can lift the tool and release the pin 40, allowing the upright 14 to drop to the floor and the pin 40 aligns with the hole 7b. The thumb-actuated operator is released, allowing the pin 40 to insert into the hole 7b, driven by the spring 50. The wheel thus is lowered so the tool and its panel load can be wheeled to a destination. When it is desired to unload the panel at a destination, one of the thumb-actuated operators is pressed again, withdrawing the pin 40 from the hole 7b so the tray can be lowered to the floor where the pin 40 then lines up with hole 7c. Releasing of the thumb-actuated operator again restores the pin 40 into the hole 7c securing it in position and providing a relative stability for the tool. Then the panel can be removed.

Certain modifications and improvements will occur to those skilled in the art upon reading the foregoing description. For example, The handle could be provided with only one actuating lever. Also, the actuating lever(s) could be located differently and can be actuated otherwise than by a thumb. In addition, the relative positions of the pin and the upper and lower holes could be reversed: i.e. the pin could be mounted to the wheel assembly with the holes in the frame. This configuration could be readily adopted if the pin is actuated by a solenoid and the actuator is a push button that closes an electrical circuit to the solenoid. Other ways to configure the catch to bind the wheel assembly to the frame can also be used.

It should be understood that all such modifications and improvements have been omitted for the sake of conciseness and readability, but are properly within the scope of the following claims.

What is claimed is:

1. A tool for moving panels comprising
   a frame having an upper end, a lower end, a linkage fork, a lower linkage rod from the linkage fork, and a handle,
   a tray mounted to the lower end of the frame,
   a wheel assembly having a wheel, the wheel assembly mounted to the frame for travel toward the upper end and toward the lower end of the frame,
   a catch to bind the wheel assembly to the frame at an upper position and at a lower position on the frame, the lower position being located on the frame so that a bottom of the wheel extends below the tray and the upper position being located so that the bottom of the wheel does not extend below the tray, and
   an actuator for the catch enabling a user to bind the wheel assembly to the frame at the upper and lower positions on the frame, wherein the actuator includes an operator control at two opposing handle ends and connected to the catch by a mechanical linkage, so that a panel can be loaded to the tray, the wheel assembly can be bound to the frame at the lower position to enable movement of the panel to a destination by rolling the wheel on a horizontal surface, and the wheel assembly can be unbound from the frame to lower the tray for unloading of the panel from the tray at the destination.

2. The tool for moving panels as shown in claim 1 wherein the catch is mounted on the frame and includes a retractable pin which can extend into an upper hole in the wheel assembly at the lower position and into a lower hole in the wheel assembly at the upper position.

3. The tool for moving panels as shown in claim 1 wherein the catch includes a spring to urge the retractable pin into the respective upper and lower holes, and a linkage is included to retract the pin from the respective upper and lower holes.

4. The tool for moving panels as shown in claim 1 wherein the frame includes a handle that has an operator control and a linkage connects the operator control to the catch.

5. The tool for moving panels as shown in claim 1 wherein the frame includes a handle and the actuator includes an operator control at the handle.

6. The tool for moving panels as shown in claim 1 wherein the frame includes a handle and the actuator includes an operator control at the handle connected to the catch by a mechanical linkage.

7. The tool for moving panels as shown in claim 6 wherein the handle has operator controls at two opposing handle ends so an operator gripping the handle with either a left hand or a right hand can move the operator control with the thumb of the hand gripping the handle.

8. The tool for moving panels as shown in claim 7 wherein the linkage fork being pivotally mounted on the frame above the tray and below the handle, and wherein the lower linkage rod extends from the linkage fork to the catch and first and second control rods from the linkage fork to the respective operator controls.

9. The tool for moving panels as shown in claim 1 wherein the frame has an internal passageway and the wheel assembly has a vertical stem disposed within the internal passage way with holes in the vertical stem to receive a pin from the catch to bind the wheel assembly to the frame at the upper position and at the lower position on the frame.

10. The tool for moving panels as shown in claim 9 wherein vertical stem has a vertically-oriented slot and the frame has a pin that extends into the internal passageway and into the vertically-oriented slot.

11. A tool for moving panels comprising a frame having an upper end and a lower end and an internal passageway, a tray mounted to the lower end of the frame and a handle mounted to the upper end of the frame, a wheel assembly having wheel and a vertical stem, the vertical stem of the wheel assembly mounted within the internal passageway of the frame for travel toward the upper end of the frame and toward the lower end of the frame, the vertical stem having holes, a catch mounted on the frame to bind the vertical stem of the wheel assembly to the frame, the catch including a spring and a retractable pin which can extend into an upper hole in the vertical stem assembly at a lower position and into a lower hole in the vertical stem at an upper position, the lower position being located on the frame so that a bottom of the wheel extends below the tray and the upper position being located so that the bottom of the wheel does not extend below the tray, wherein the spring urge the retractable pin into the respective upper and lower holes, an actuator for the catch enabling a user to bind the wheel assembly to the frame at the upper and lower positions on the frame, and a linkage to release the pin from the respective upper and lower holes, the handle having operator controls at two opposing handle ends so an operator gripping the handle with either a left hand or a right hand can move one of the operator controls with the thumb of the hand gripping the handle, and a linkage fork pivotally mount on the frame above the tray and below the handle, a lower linkage rod from the linkage fork to the catch and first and second control rods from the linkage fork to the respective operator controls, so that a panel can be loaded to the tray, the wheel assembly can be bound to the frame at the lower position to enable movement of the panel to a destination by rolling the tool on the wheel on a horizontal surface, and the wheel assembly can be unbound from the frame to lower the panel for unloading from the tray at the destination.

* * * * *